United States Patent Office 2,839,572
Patented June 17, 1958

2,839,572

ALLYLIDENE DICROTONATES AND PROCESS FOR THEIR PRODUCTION

Howard R. Guest, Charleston, and Harry A. Stansbury, Jr., South Charleston, W. Va., assignors to Union Carbide Corporation, a corporation of New York No Drawing. Application March 29, 1956
Serial No. 574,624

5 Claims. (Cl. 260—486)

This invention relates to certain novel triply unsaturated aldehyde diacylates and to a process for their production. More particularly, the present invention relates to allylidene dicrotonates (2-propene-1,1-diol dicrotonates) and to a process for their production.

The novel compounds of the present invention may be represented by the general formula:

$$\begin{array}{c} H_3C-HC=CH-C-O \\ \phantom{H_3C-HC=CH-C-}\backslash \\ \phantom{H_3C-HC=CH-C-O} CH-C=CH_2 \\ \phantom{H_3C-HC=CH-C-}/ \phantom{CH-}\vert \phantom{=CH_2} R \\ H_3C-HC=CH-C-O \end{array}$$

wherein R is a member selected from this group consisting of hydrogen, alkyl and halogen.

Illustrative of the novel compounds of the present invention are 2-propene-1,1-diol dicrotonate; 2-methyl-2-propene-1,1-diol dicrotonate; 2-ethyl-2-propene-1,1-diol dicrotonate; 2-propyl-2-propene-1,1-diol dicrotonate; 2-butyl-2-propene-1,1-diol dicrotonate; 2-pentyl-2-propene-1,1-diol dicrotonate; 2-hexyl-2-propene-1,1-diol dicrotonate; 2-chloro-2-propene-1,1-diol dicrotonate; and 2-bromo-2-propene-1,1-diol dicrotonate.

The compounds of the present invention may be prepared by reacting crotonic anhydride with an aldehyde having the formula $$CH_2=\underset{\underset{R}{\vert}}{C}-CHO$$

in accordance with the following general equation $$H_3C-CH=CH-\overset{O}{\overset{\|}{C}}\diagdown_{O}\diagup\overset{O}{\overset{\|}{C}}-\underset{\underset{R}{\vert}}{C}=CH_2 + H_2O \longrightarrow$$

$$H_3C-CH=CH-\overset{O}{\overset{\|}{C}}$$

$$\begin{array}{c} H_3C-CH=CH-\overset{O}{\overset{\|}{C}} \\ \phantom{H_3C-CH=CH-}\diagdown O \\ \phantom{H_3C-CH=CH-C-O}CH-\underset{\underset{R}{\vert}}{C}=CH_2 \\ \phantom{H_3C-CH=CH-}\diagup O \\ H_3C-CH=CH-\overset{\|}{\underset{O}{C}} \end{array}$$

wherein R is hydrogen, alkyl or halogen.

The reaction may be conducted at a temperature of from 0° to 100° C., but is preferably conducted at a temperature of from 25° to 60° C.

Although the reaction may be conducted in the absence of a catalyst, it is preferably conducted in the presence of a strong acid catalyst in an amount corresponding to 0.02 to 0.50 percent by weight of the total anhydride and aldehyde present in the reaction mixture. Illustrative of acid catalysts which may be used are sulfuric, hydrochloric, phosphoric, sulfoacetic and toluenesulfonic.

In conducting the reaction, the mol ratio of acid anhydride to aldehyde may range from 3:1 to 0.3:1. However, the mol ratio is preferably within the range of from 2:1 to about 1.25:1 of acid anhydride to aldehyde.

The progress of the reaction depends upon the temperature, catalyst concentration and molar ratio of the reactants. The esterification is substantially complete after a reaction period of from about 1 hour to about 100 hours.

A preferred process involves the addition of the unsaturated aldehyde to a solution of mineral acid catalyst in the crotonic anhydride. Certain unsaturated aldehydes, such as 2-chloroacrolein, are prone to undergo dimerization even at 25° C. A practical way to minimize such a dimerization at a given temperature is to dilute the aldehyde with an inert solvent. Therefore, in the preparation of 2-substituted allylidene dicrotonates, it is desirable to have the unsaturated aldehyde diluted with an inert solvent. Such diluents are particularly desirable in the preparation of 2-chloroallylidene dicrotonate.

Strong mineral acid causes some polymerization and/or condensation of unsaturated aldehydes. Therefore the preferred method involves the addition of the acid catalyst to crotonic anhydride rather than to the unsaturated aldehyde.

The reaction, in most cases, is so rapid under the conditions employed that it can be carried out on either a batch or on a continuous basis.

Since the reaction is reversible and is catalyzed by strong acid, the mineral acid should be neutralized before the reaction mixture is distilled. Examples of reagents suitable for neutralization of the catalysts are alkali metal acetates, propionates, crotonates and carbonates.

The following examples are illustrative:

Example 1

A mixture of 616 grams of crotonic anhydride (4 moles) and 1 milliliter of concentrated sulfuric acid (0.0375 equivalents) was stirred at 45° C., while a solution of 127 grams of 88 percent acrolein (2 moles) in 100 grams of benzene solvent were fed over a period of 1.5 hours. After reaction periods of 1 hour at 45° C. and 16 hours at 25° C., 3.1 grams of anhydrous sodium acetate (0.0375 equivalents) were added. The mixture was fractionated under reduced pressure to isolate allylidene dicrotonate (2-propene-1,1-diol dicrotonate), having these properties: boiling point 120° C./4 millimeters, $n$ 30/D 1.4670, specific gravity 20/20° 1.044, 99 percent purity by analytical bromination, 106 percent purity by analytical saponification. (The purity by saponification was probably higher than theory because the acrolein liberated by saponification consumed some alkali). The yield and efficiency were 62 percent and 91 percent, respectively, based on acrolein.

Example 2

A solution of 1 milliliter of concentrated sulfuric acid (0.0375 equivalents) and 616 grams of crotonic anhydride (4 moles) was stirred at 45° C. while a solution of 191 grams of 88 percent acrolein (3 moles) in 150 grams of benzene were fed over a period of 70 minutes. After standing 16 hours at 25° C., 3.1 grams of anhydrous sodium acetate (0.0375 equivalents) were added to neutralize the catalyst. The mixture was fractionated under reduced pressure to obtain allylidene dicrotonate in 82 percent yield and 86 percent efficiency based on acrolein.

Example 3

A mixture of 416 grams of crotonic anhydride (2.7 moles) and 1 milliliter of concentrated sulfuric acid (0.0375 equivalents) was stirred at 45°–50° C. while 359 grams of methacrolein (5.12 moles) were fed over a period of an hour. After a reaction period of 1.5 hours at 50° C., 4.1 grams of anhydrous sodium acetate (0.05 equivalents) were added to neutralize the catalyst. The mixture was fractionated under reduced pressure to obtain methallylidene dicrotonate (2-methyl-2-propene-1,1-diol dicrotonate), having these properties: boiling range 113°–119° C./1 millimeter, $n$ 30/D 1.4689, specific gravity 20/20° 1.032, 64.3 percent C (theory 64.3 percent), 6.9 percent H (theory 7.1 percent), 93.5 percent purity by analytical bromination. The yield and efficiency were 76 percent and 80 percent, respectively, based on crotonic anhydride.

*Example 4*

A mixture of 308 grams of crotonic anhydride (2.0 moles) and 2 milliliters of concentrated sulfuric acid catalyst (0.075 equivalents) was stirred at 50° C. while 327 grams of a 27.7 percent solution of 2-chloroacrolein in 1,1,2-trichloroethane (1.0 mole) were fed over a period of 30 minutes. After a reaction period of 2.5 hours at 50° C., 8.2 grams of anhydrous sodium acetate (0.1 equivalents) were added to neutralize the catalyst. The mixture was fractionated under reduced pressure to obtain 2-chloroallylidene dicrotonate (2-chloro-2-propene-1,1-diol dicrotonate), having these properties: boiling point 126° C./1 millimeter, $n$ 30/D 1.4797, specific gravity 20/20° 1.148, 54.1 percent C (theory 54.0 percent), 5.5 percent H (theory 5.3 percent), 14.0 percent Cl (theory 14.5 percent), 230 molecular weight by the Menzies-Wright method (theory 244.5). The yield and efficiency were 73 percent and 90 percent, respectively, based on 2-chloroacrolein.

The novel compounds of the present invention may be homopolymerized or copolymerized with other monomers, such as vinyl chloride, to yield resins which are useful as protective coatings. For example, homopolymerization of allylidene dicrotonate at 100° C. (using 1 percent diacetyl peroxide catalyst) for 90 hours yielded a clear, brittle, acetone soluble resin, which could be applied to metal or other objects as a protective coating.

When heated in the presence of 1 percent azobisisobutyronitrile catalyst at 50° C. for 123 hours, chloroallylidene dicrotonate was found to polymerize at the rate of 0.174 percent conversion per hour to yield a low molecular weight polymer. Chloroallylidene dicrotonate was also found to copolymerize with vinyl chloride, vinylidene chloride or styrene to form soluble copolymers and to copolymerize with acrylonitrile to form insoluble copolymers. These copolymers are useful in the field of rigid sheeting.

We claim:
1. Compounds having the formula:

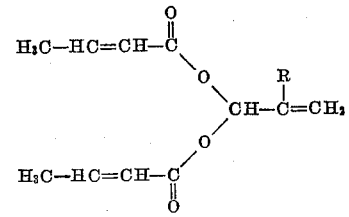

wherein R is a member selected from the class consisting of hydrogen, lower alkyl and halogen.

2. 2-propene-1,1-diol dicrotonate.
3. 2-methyl-2-propene-1,1-diol dicrotonate.
4. 2-chloro-2-propene-1,1-diol dicrotonate.
5. The process which comprises reacting crotonic anhydride with an aldehyde having the formula:

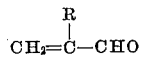

wherein R is a member selected from the class consisting of hydrogen, lower alkyl and halogen.

References Cited in the file of this patent
UNITED STATES PATENTS
2,312,193    Richter _____ Feb. 23, 1943

UNITED STATES PATENT OFFICE
Certificate of Correction

Patent No. 2,839,572                      June 17, 1958

Howard R. Guest et al.

It is hereby certified that error appears in the printed specification of the above numbered patent requiring correction and that the said Letters Patent should read as corrected below.

Column 1, lines 22 to 28 inclusive, the formula should appear as shown below instead of as in the patent:

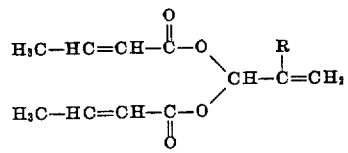

Signed and sealed this 23rd day of September 1958.

[SEAL]

Attest:
KARL H. AXLINE,
*Attesting Officer.*

ROBERT C. WATSON,
*Commissioner of Patents.*